United States Patent
Lee

(10) Patent No.: US 7,203,904 B2
(45) Date of Patent: Apr. 10, 2007

(54) DATA PROCESSING SYSTEM USING A DUAL MONITOR AND CONTROLLING METHOD OF NETWORK SYSTEM THEREBY

(75) Inventor: Eun Seog Lee, Sampoong Apt. 21-1102, 1685 Seocho-dong, Seocho-ku, Seoul (KR)

(73) Assignees: Tophead.com, Seoul (KR); Eun Seog Lee, Seoul (KR)

( * ) Notice: Subject to any disclaimer, the term of this patent is extended or adjusted under 35 U.S.C. 154(b) by 718 days.

(21) Appl. No.: 09/890,253

(22) PCT Filed: Feb. 20, 2001

(86) PCT No.: PCT/KR01/00250

§ 371 (c)(1),
(2), (4) Date: Aug. 6, 2001

(87) PCT Pub. No.: WO01/63396

PCT Pub. Date: Aug. 30, 2001

(65) Prior Publication Data

US 2002/0190919 A1    Dec. 19, 2002

(30) Foreign Application Priority Data

Feb. 21, 2000  (KR) .............................. 2000-4663 U
Jun. 28, 2000  (KR) .............................. 2000-36175
Jul. 19, 2000  (KR) .............................. 2000-41419

(51) Int. Cl.
*G11B 27/00*   (2006.01)

(52) U.S. Cl. ...................... 715/717; 715/718; 715/778; 715/740; 715/805

(58) Field of Classification Search ................ 345/1.1, 345/1.2, 1.3, 3.1, 204–206, 864–866, 502, 345/519, 520, 531, 716–723, 213, 214; 715/750–759, 715/760–765, 717, 718, 740, 741, 778, 805, 715/962, 700
See application file for complete search history.

(56) References Cited

U.S. PATENT DOCUMENTS 4,965,559 A * 10/1990 Dye .......................... 345/2.2
5,361,078 A * 11/1994 Caine ....................... 345/1.3
5,373,307 A * 12/1994 Shiraishi ..................... 345/2.2

(Continued)

OTHER PUBLICATIONS

"Windows98 Multiple Monitor Support," http://www.languru.com/multimon.htm, Jul. 26, 1998.*

(Continued)

*Primary Examiner*—Tadesse Hailu
(74) *Attorney, Agent, or Firm*—Rosenbreg, Klein & Lee

(57) ABSTRACT

Disclosed is a data processing system using a dual monitor, on which separate contents are displayed respectively, as a display device. The data processing system includes: a memory providing a data processing area using programs; an input device for inputting data; a first VGA generating screen data for a result processed by programs; a second VGA generating screen data for a result processed by programs and different from the contents displayed by the first VGA; a processor processing data input through the input device using the memory and outputting the processed result through the first and second VGAs; a first monitor for displaying screen data from the first VGA; and a second monitor for displaying screen data from the second VGA.

6 Claims, 2 Drawing Sheets

U.S. PATENT DOCUMENTS

| | | | | |
|---|---|---|---|---|
| 5,488,385 A * | 1/1996 | Singhal et al. | | 345/3.1 |
| 5,537,128 A * | 7/1996 | Keene et al. | | 345/89 |
| 5,563,665 A * | 10/1996 | Chang | | 348/552 |
| 5,694,141 A * | 12/1997 | Chee | | 345/3.1 |
| 5,764,201 A * | 6/1998 | Ranganathan | | 345/3.3 |
| 5,835,090 A * | 11/1998 | Clark et al. | | 715/764 |
| 5,848,294 A * | 12/1998 | Clark | | 710/36 |
| 5,923,307 A * | 7/1999 | Hogle, IV | | 345/4 |
| 5,949,437 A * | 9/1999 | Clark | | 345/502 |
| 6,025,870 A * | 2/2000 | Hardy | | 348/14.1 |
| 6,025,871 A * | 2/2000 | Kantor et al. | | 348/14.07 |
| 6,049,316 A * | 4/2000 | Nolan et al. | | 345/698 |
| 6,118,413 A * | 9/2000 | Bril et al. | | 345/596 |
| 6,215,459 B1 * | 4/2001 | Reddy et al. | | 345/3.1 |
| 6,232,932 B1 * | 5/2001 | Thorner | | 345/1.3 |
| 6,297,785 B1 * | 10/2001 | Sommer et al. | | 345/1.1 |
| 6,297,817 B1 * | 10/2001 | Larson et al. | | 345/213 |
| 6,326,935 B1 * | 12/2001 | Boger | | 345/3.2 |
| 6,343,313 B1 * | 1/2002 | Salesky et al. | | 709/204 |
| 6,373,503 B1 * | 4/2002 | Perkes | | 715/718 |
| 6,587,082 B1 * | 7/2003 | Moore | | 345/1.3 |
| 6,624,797 B1 * | 9/2003 | Wheeler et al. | | 345/1.2 |
| 6,804,724 B2 * | 10/2004 | Shin | | 710/2 |
| 6,806,885 B1 * | 10/2004 | Piper et al. | | 345/545 |
| 6,823,525 B1 * | 11/2004 | Martyn | | 719/323 |
| 2002/0003507 A1 * | 1/2002 | Dodge | | 345/3.1 |
| 2002/0149541 A1 * | 10/2002 | Shin | | 345/3.1 |

OTHER PUBLICATIONS

Masayuki Tani et al, "Courtyard: Integrating Shared Overview on a Large Screen and Per-user Detail on Individual Screens,"ACM 1994.*

Jonathan Grudin, "Primary Tasks and Peripheral Awareness: A Field Study of Multiple Monitor Use," Microsoft Research, Sep. 13, 1999.*

* cited by examiner

DATA PROCESSING SYSTEM USING A DUAL MONITOR AND CONTROLLING METHOD OF NETWORK SYSTEM THEREBY

TECHNICAL FIELD

The present invention relates to a data processing system using a dual monitor and controlling method of network system thereby, and more particularly, to a data processing system using a dual monitor and controlling method of network system thereby, which can process data by a computer using a dual monitor, on which separate contents are displayed respectively, as a display device.

BACKGROUND ART

In general, a data processing result of a computer is displayed on a monitor to show it to a user. The contents displayed on the monitor is converted and displayed into video signal through a video graphics adapter (hereinafter, called as "VGA") controlled by a processor.

The user of the computer, occasionally, works while simultaneously loading several programs in one computer, for example, works with the computer in a state that a word processing program for word processing and a browser program for communication are loaded at the same time.

For example, when the user loads the word processing program, several web-browsers, a graphic editor program and others using the computer operated by an operating system of a window control type, links concerning the loaded programs are registered on a tray of a windows screen and a presently used program is displayed on the monitor.

However, generally, one computer is connected to one monitor. Thus, even though several programs are loaded, only one screen corresponding to the presently used program is displayed on the monitor. Therefore, when the user works confirming the processed result in respect with two or more programs at the same time, the user must select whenever the corresponding program on the window tray is needed, to pop up the needed program on the monitor.

To solve the problem, a windows 98 version having a multi-display function, which is an operating system developed by Microsoft Corporation, has been disclosed and widely used. The multi-display function means that two or more VGAs are connected to two monitors respectively and each monitor displays the processed result by the program set by the user.

The multi-display function can be very conveniently used in case that the user must work confirming the processed contents in respect with two or more programs at the same time after several programs are loaded. However, because two or more monitors are needed to use the multi-display function, a desk having a wide area is required.

Meanwhile, if the computer is connected to an Internet to connect to a specific Homepage through a web browser, information provided by the corresponding Homepage is displayed on the monitor.

However, most of the Homepages generally allows space for advertisement on a part of their own web page. Thus, the user must shut a window for the advertisement, which the user does not want, and enlarge or scroll the window, which displays the required information.

However, an advertiser wants to show the ad contents without regard to the user's intention because ad effects are decreased if the user shuts the window for the advertisement without seeing the ad contents. Conventionally, there are no systems and methods to satisfy both the user and the advertiser.

DISCLOSURE OF THE INVENTION

It is, therefore, an object of the present invention to provide a data processing system using a dual monitor and controlling method of network system thereby, which has an auxiliary monitor for displaying secondary information such as an advertisement besides a main monitor for displaying processed contents of programs often used by a user, and which displays the processed contents of the programs on the main monitor and displays the secondary information on the auxiliary monitor, thereby improving efficiency in use of a computer.

It is another object of the present invention to provide a data processing system using a dual monitor and controlling method of network system thereby, which constructs a network using computers using dual monitors to make an exchange of data with the other party convenient.

To achieve the above objects, the present invention provides a data processing system using dual monitors including: a memory providing a data processing area using a program; at least one or more input means for inputting data; a first video graphics adapter (VGA) generating and outputting screen data for displaying a result processed by at least one or more programs; a second graphics adapter generating and outputting screen data for displaying a result processed by at least one or more programs, the result being different from the contents displayed by the first VGA; a processor processing data input through the input means using the memory and outputting the processed result through the first and second VGAs; a first monitor for displaying screen data output from the first graphics adapter; and a second monitor for displaying screen data output from the second graphics adapter, wherein the processor displays the processed result of a main program presently used by a user through the first VGA and the first monitor, processes information, which is different from the contents displayed on the first monitor and input from the outside, and displays the information through the second VGA and the second monitor, and in case of selecting one of user interfaces displayed through the first or second monitors, displays the processed result on the other monitor.

The data processing system further includes a sound processing part having a microphone for inputting sound signal and a speaker for outputting sound, which are integrated to the first and second monitors. The second monitor is constructed integrally with the first monitor and has a screen size smaller than that of the first monitor. The data processing system further includes a digital camera integrated with the dual monitors and for inputting video information, wherein video data input by the digital camera is input to the processor through the a universal serial bus (USB) port.

The processor further includes a communication interface for communicating with an external network to construct a network, and further includes a broadcasting receiving part for receiving TV/Radio broadcasting wave and outputting video and audio signals.

The video data received by the broadcasting receiving part is output through one of the first and second VGAs, and the first and second VGAs and the first and second monitors are connected with one video cable respectively, or connected with one video cable respectively, which integrates a plurality of lines for transmitting two video signals into one package.

Furthermore, the first and second VGAs are constructed with a dual VGA having two output ports.

In the present invention, a dual monitor for use in a computer system having a VGA outputting two video signals includes a first monitor for receiving and displaying a first information data comprising main processing contents of a program, which is presently being used by a user, output from a processor of the computer system; and a second monitor formed integrally with the first monitor, for receiving and displaying anyone of the first information data being displayed on the first monitor, a second information data and an ad data which are provided with the computer system through a network.

According to an another aspect of the present invention, the present invention provides a method for controlling network using a data processing system using a dual monitor, the method including the steps of: constructing a network using a plurality of computers and a server, the computer using a dual monitor having first and second monitors as a display means, the server connecting the plurality of computers with the network to control them and connecting to an Internet; and displaying results processed by a program used by a user on the first monitor and displaying information provided by a server on the second monitor when the user connects to the network using the computer.

The information displayed on the second monitor is a message or ad contents provided and displayed by the server, and the server secures a control right to the second monitor of the user's computer and controls the use of the second monitor by the user's manipulation.

In case of using the plurality of the computers connected to the network as a settlement system, the first or second monitors connected to a reporter's computer and a deciding officer's computer respectively display settlement contents transmitted from the other parties' computers respectively and the other monitors display different data except for the settlement contents respectively.

In case of using the plurality of the computers connected to the network as a message communication system, the received message is displayed on the second monitor.

In case that at least two or more users work jointly with the same program using the plurality of computers connected to the network, the contents of the other party's work is displayed on the second monitor to work while confirming the contents of the other party's work at the same time.

In case of using the plurality of the computers connected to the network as a video communication system, a digital camera is mounted on each computer, the user's picture is transmitted to the other party's computer, and at the same time, the user's picture is displayed on one of the first and second monitors, and the other party's picture is displayed on the other monitor.

As described above, according to the present invention, monitors for displaying different information are connected to a computer, thereby improving efficiency in use of the computer.

BRIEF DESCRIPTION OF THE DRAWINGS

Further objects and advantages of the invention can be more fully understood from the following detailed description taken in conjunction with the accompanying drawings in which.

BEST MODE FOR CARRYING OUT THE INVENTION

Figure 1:
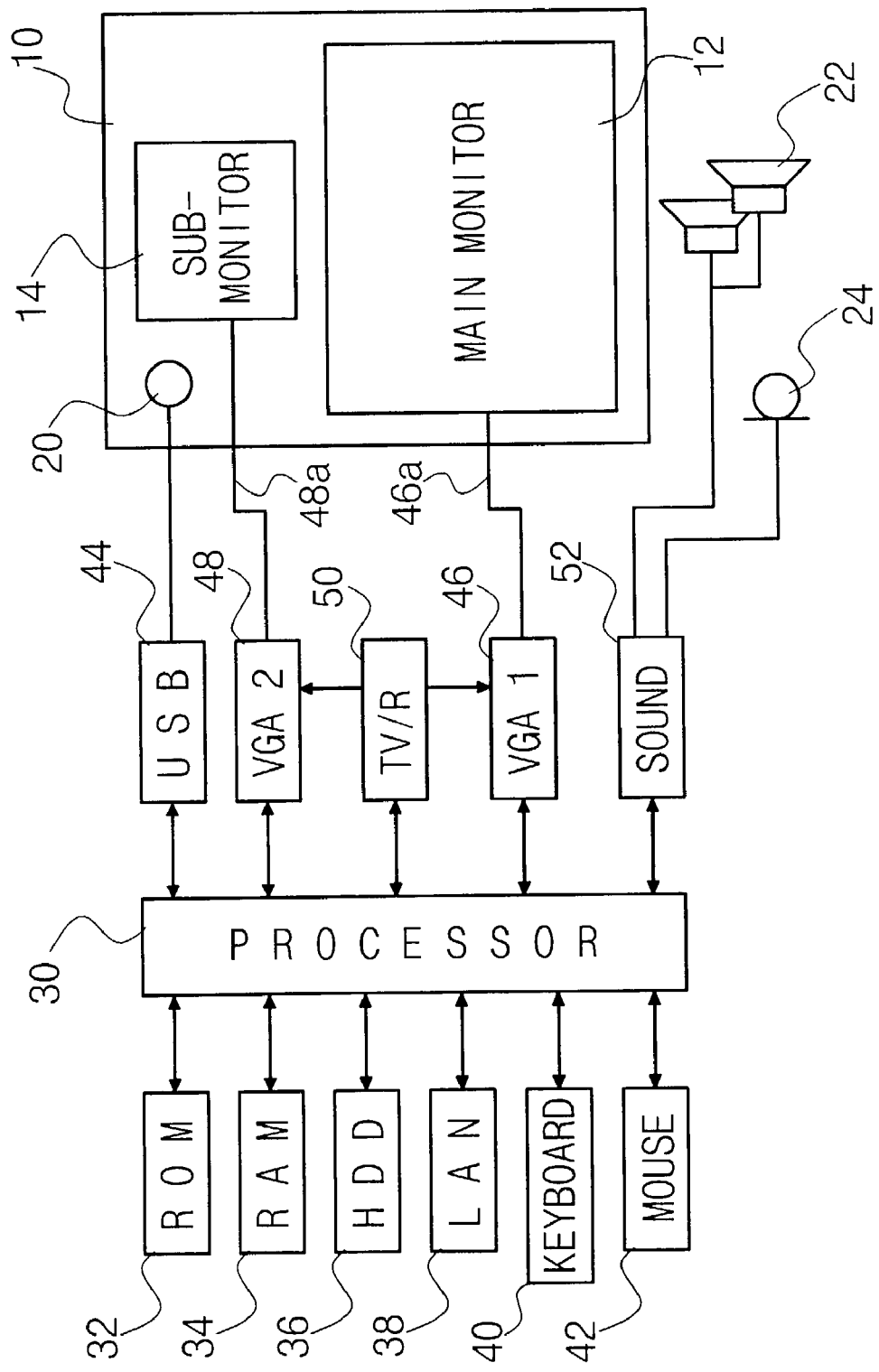
FIG. 1 is a block diagram of a structure of a data processing system using dual monitors according to the present invention.

The present invention will now be described in detail in connection with preferred embodiments with reference to the accompanying drawings. For reference, like reference characters designate corresponding parts throughout several views.

Figure 2:
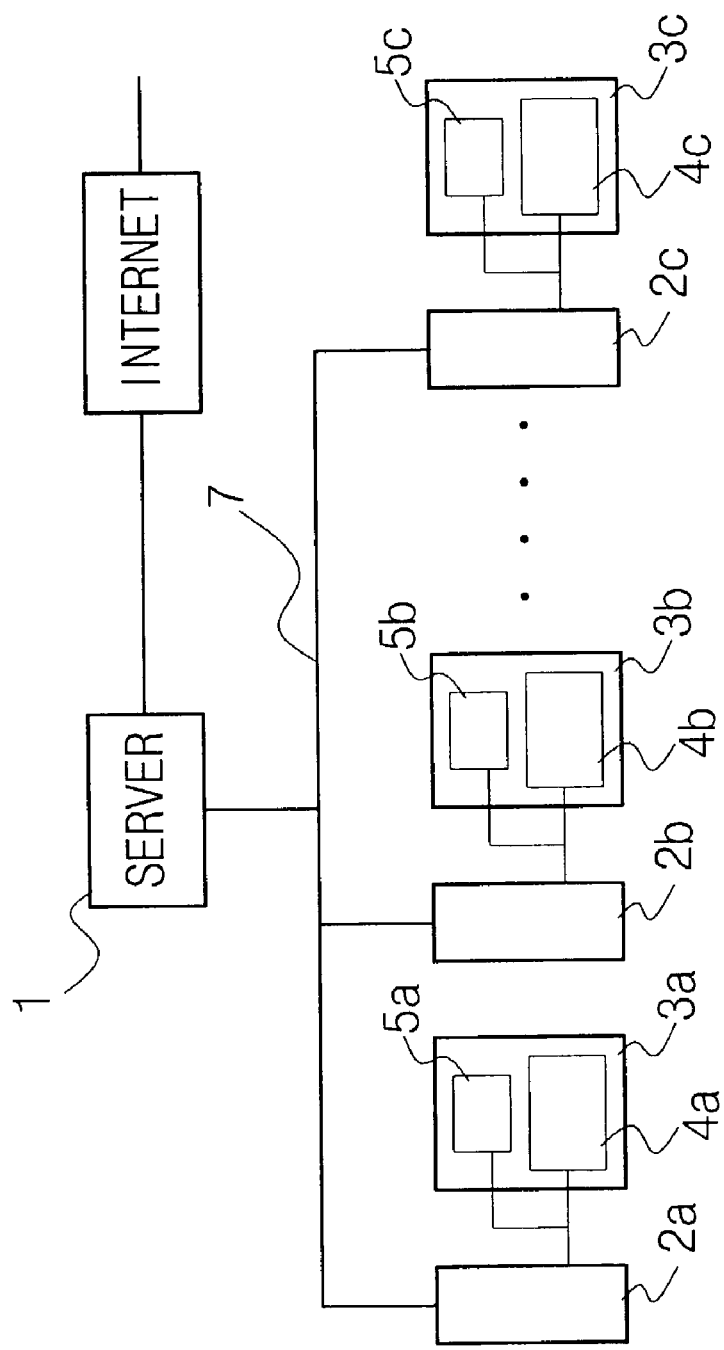
FIG. 2 is a block diagram of a network constructed by using the data processing system using dual monitors according to the present invention.

FIG. 1 is a block diagram of a structure of a data processing system using dual monitors according to the present invention, and FIG. 2 is a block diagram of a network constructed by using the data processing system using dual monitors according to the present invention.

As shown in FIG. 1, the data processing system using a dual monitor according to the present invention includes: an input device having a keyboard 44a for inputting characters and symbols, a mouse 44b for changing a position of a pointer on a window or others; a processor 32 for analyzing, calculating and managing the input information; a memory device having a ROM 34 and a RAM 36 for memorizing required programs and data to help a processing work of a processor 30; a hard disk drive (HDD) 38, which is a storing device for storing data processed by the processor 32; a controlling device such as a bus controller, a drive (HDD, CD-ROM drive or others) controller and an external input/output (I/O) controller; an output device having a dual monitor 10, a speaker 22 or others for outputting the result processed by the processor; and a communication device for serving to transmit information between computers.

There are a LAN (Local Area Network) card, a modem and etc. as the communication device, and in the present invention, the communication device is connected to a network 7 through the LAN card 38.

The dual monitor 10 includes: a first monitor 12 serving as a main monitor for displaying the processed result of program, which a user uses presently; and a second monitor 14 mounted on the first monitor 12 and serving as an auxiliary monitor for displaying contents relating to or being different from the contents displayed on the first monitor 12.

The first and second monitors 12 and 14 are constructed integrally with each other by a common housing. The first and second monitors 12 and 14 may be constructed with a CRT (Cathode Ray Tube) display, a LCD (Liquid Crystal Display) panel, or other display elements. In consideration of the bulk, it is preferable to use the LCD panels for both of the monitors 12 and 14.

A digital camera 20 is mounted at the side of the second monitor 14 to input video information when it is used for a video telephone, and inputs video data to the processor 30 through a USB (Universal Serial Bus) port 44.

The video data processed and output from the processor 30 are input to the first and second monitors 12 and 14 through first and second video graphics adapters (VGAs) 46 and 48. In this embodiment of the present invention, a system constructed by two VGAs is disclosed, but it may be constructed with a dual port VGA having two output ports according to circumstances.

Video signals output through the first and second VGAs 46 and 48 are input to the first and second monitors 12 and 14 through first and second video cables 46a and 48a respectively. Because the first and second monitors 12 and 14 are formed integrally, their own video cable connecting terminals (D-sub connectors) are mounted adjacent to each other. Thus, the first and second monitors 12 and 14 may be connected to each other in such a manner that a plurality of lines for transmitting each video signal are integrated into one package and the first and second monitors 12 and 14 are connected with the first and second VGAs 46 and 48 by a video cable having a branch formed at both ends for connecting the first and second VGAs 46 and 48 and the first and second monitors 12 and 14.

The present invention having the above structure has an advantage that the number of the cables connected between the computer and the peripheral devices is decreased, and thereby the cables may be arranged in more convenience.

Moreover, the VGA can process two video signals like the conventional dual port VGA and has one D-sub connector serving as a video output port and having a plurality of pins for transmitting two video signals.

In the same way, also the dual monitor 10 has one D-sub connector serving as a video input port and having a plurality of pins for receiving two video signals, and the video cables connecting the video output port and the video input port are connected with each other by one video cable integrating the plurality of lines into one package for transmitting two video signals.

The present invention includes a broadcasting receiving part, i.e., a TV/R receiving part 50 for receiving TV/Radio broadcasting wave, such that one of the first and second monitors 12 and 14 may be used as a TV screen.

The TV/R receiving part 50 outputs TV video signal received by a control of the processor 30 through one of the first and second VGAs 46 and 48, and audio signal is output through a sound processing part 52, which will be described later, by the processor 30.

Therefore, the user can watch TV broadcasting through the second monitor 14 during using an Internet using a specific program through the first monitor 12, for example, a web browser. Especially, in case of receiving the radio broadcasting, because only audio signal is output, different programs may be processed through the first and second monitors 12 and 14.

It is possible that the dual monitor 10 has a broadcasting receiving part, which can receive TV/Radio broadcasting like the TV/R receiving part 50, the received broadcasting signals are transmitted to the processor 30 through a USB port 46, video signal of the broadcasting signals is output through one of the first and second VGAs 46 and 48, and audio signal is output through a speaker 22 through the sound processing part 52.

Furthermore, it is possible that the dual monitor 10 has a broadcasting receiving part, which can receive TV/Radio broadcasting like the TV/R receiving part 50, video signals are output through the first or second monitors 12 or 14 from the broadcasting receiving part, and audio signal is output through the speaker 22.

For this, the broadcasting receiving part must be controlled by the processor 30 in a change of broadcasting reception channels, a selection of the output monitor, or others, and convert and output video signals received from a tuner, which receives broadcasting signals, into video signals, which can be output through the first or second monitors 12 or 14.

The sound processing part 52, which processes audio signal and outputs into sound, is connected to the processor 30. The sound processing part 52 serves to output audio signal of broadcasting signals received by the TV/R receiving part 50, to produce audio signal and output through the speaker 22 when a multimedia is played by the processor 30, and to input sound through a microphone 24.

The speaker 22 connected to the sound processing part 52 basically has two speakers for stereo output. In case that the sound processing part 52 has a surround output function, the speaker 22 may have a plurality of speakers corresponding to the surround output function.

Additionally, the speaker 22 may be formed integrally with the housing having the dual monitor 10 to reduce an installation space.

A network constructed by using the data processing system using the dual monitor according to the present invention may be used for various purposes as follows.

First, in the present invention, a plurality of computers 2a, 2b and 2c using the dual monitor 10 as a display device form a network through the LAN cards 38 as shown in FIG. 2.

Here, dual monitors 3a, 3b and 3c connected to the plurality of computers 2a, 2b and 2c respectively include first monitors 4a, 4b and 4c and second monitors 5a, 5b and 5c respectively.

The computers 2a, 2b and 2c are connected to a network management server 1 through the LAN card 38 and form a local area network 7, and the network 7 is connected to the Internet. The characteristics in use according to the above construction will be described hereinafter.

In case of being connected to the Internet through the server 1, the processor 30 of the computer displays a web page of a Homepage connected by the web browser used by a user on the first monitor 12. The second monitor 14 displays additional information provided by the server 1, such as a message, ad information or others, and the additional information can be continuously displayed on the second monitor 14 without regard to the user's intention.

For this, the server 1 needs to secure a control right to the second monitor 14 through the computer processor 30 of the user and to control the use of the second monitor 14 by the user's manipulation.

The advertisement displayed on the second monitor 14 through the above method has an advantage that it is very profitable in securing advertisers, because having an excellent transmission effect in a server administrator position.

Moreover, after the LAN using the data processing system using the dual monitor according to the present invention, it may be used as an internal interactive system within a specific area, for example, a settlement system, and it will be described hereinafter.

Presently, settlement systems operated through the LAN take a method that, if there occurs matters to be settled while a reporter and a deciding officer do their desired work using their own computers, arrange the contents to be settled and transmit the contents to the deciding officer's computer to settle.

In case of the deciding officer, while the deciding officer is working using the dual monitor 10, a window containing the contents for settlement is popped up and displayed over the presently used window to respond to the demand of settlement.

Therefore, compared with the conventional method having a problem that the presently used window is covered with the window for settlement, because the system according to the present invention allows the deciding officer to settle through the second monitor 14 while working using the first monitor 12, the deciding officer can deal with the settlement while checking the contents presently used and the contents for settlement at the same time if the contents presently used and the contents for settlement are related with each other.

Furthermore, when at least two or more users perform jointly work with the same program using the plurality of computers 2a, 2b and 2c connected to the network 7, the contents for one user's work is displayed on the first monitor 12 and the contents for the other user's work is displayed on the second monitor 14, and thereby the users can jointly work while confirming the contents for his own work and the contents for the other party's work at the same time.

For example, when two users open the same document and input different contents to prepare a word processor file or a spreadsheet file, if the different data are input after the network controls the contents input by different users to be input into a single file, the users can input data while confirming a data input condition of the other party, thereby increasing the efficiency of work.

Furthermore, when a user interface provided by the program displayed on the first monitor 12, for example, a graphic user interface, is clicked with a mouse, the data processing system using the dual monitor according to the present invention displays a program connected to the corresponding user interface on the second monitor 14 (or to the contrary), such that a screen display area is enlarged by two monitors, thereby increasing the convenience in use of the computer.

Moreover, by using the digital camera 20 connected to the processor 30 of each of the computers 2a, 2b and 2c connected to the network 7 through the USB port 46, the data processing system according to the present invention may be used as the video communication system.

In other words, the user's picture captured with the digital camera mounted on the computer is transmitted to the other party's computer, and at the same time, the user's picture is displayed on one of his own first and second monitors, and the user's picture transmitted to the other party is displayed on the other monitor, and thereby the data processing system can be used as the video communication system.

INDUSTRIAL APPLICABILITY

As previously described, the dual monitor connected to the computer for displaying different information increases the use of the computer.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method for controlling network using a data processing system having a dual monitor, the method comprising the steps of:

constructing a network using a plurality of computers and a server, the computer using a dual monitor having first and second monitors as a display means, the server connecting the plurality of computers with the network to control them and connecting to an Internet; and displaying results processed by a program used by a user on the first monitor and an information provided by the server on the second monitor, when the user connects to the network using the computer, the server securing a control right to the second monitor of the user's computer and controls the use of the second monitor by the user's manipulation.

2. The method as claimed in claim 1, wherein the information displayed on the second monitor is a message or ad contents provided and displayed by the server.

3. The method as claimed in claim 1, wherein, when the plurality of the computers connected to the network are used as a message communication system, the received message is displayed on the second monitor.

4. The method as claimed in claim 1, wherein, when at least two or more users work jointly with the same program using the plurality of computers connected to the network, the contents of the other party's work is displayed on the second monitor to work while confirming the contents of the other party's work at the same time.

5. The method as claimed in claim 1, wherein, when the plurality of the computers connected to the network are used as a video communication system, a digital camera is mounted on each computer, the user's picture is transmitted to the other party's computer, and at the same time, the user's picture is displayed on one of the first and second monitors, and the other party's picture is displayed on the other monitor.

6. A method for controlling network using a data processing system having a dual monitor, the method comprising the steps of:

constructing a network using a plurality of computers and a server, each computer using a dual monitor having first and second monitor displays, the server connecting the plurality of computers with the network to control them and connecting to an Internet; and displaying results processed by a program used by a user on the first monitor and an information provided by the server on the second monitor, when the user connects to the network using the computer, when the plurality of the computers connected to the network are used as a settlement system, the first or second monitor displays being respectively connected to a reporter's computer and a deciding officer's computer to respectively display settlement contents transmitted from the other parties' computers and the other monitors display different data except for the settlement contents.

* * * * *